United States Patent
Bouta et al.

(10) Patent No.: US 11,364,955 B2
(45) Date of Patent: Jun. 21, 2022

(54) ENGINE BAY STRUCTURE OF VEHICLE AND METHOD OF ASSEMBLING CAPSULE COVER

(71) Applicant: Mazda Motor Corporation, Hiroshima (JP)

(72) Inventors: Daisuke Bouta, Aki-gun (JP); Yukiya Tanaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 38 days.

(21) Appl. No.: 17/156,081

(22) Filed: Jan. 22, 2021

(65) Prior Publication Data

US 2021/0253178 A1 Aug. 19, 2021

(30) Foreign Application Priority Data

Feb. 18, 2020 (JP) .............................. JP2020-025195

(51) Int. Cl.
*B62D 25/08* (2006.01)
*B60R 16/023* (2006.01)

(52) U.S. Cl.
CPC ........ *B62D 25/082* (2013.01); *B60R 16/0231* (2013.01); *B62D 25/088* (2013.01)

(58) Field of Classification Search
CPC .. B62D 25/082; B62D 25/088; B60R 16/0231
USPC .................................................... 296/203.02
See application file for complete search history.

(56) References Cited

U.S. PATENT DOCUMENTS

| | | | | |
|---|---|---|---|---|
| 3,693,602 A | * | 9/1972 | Thien ...................... | F02B 77/13 181/204 |
| 3,923,114 A | * | 12/1975 | Suzuki ................ | B60R 13/0884 181/204 |
| 4,241,702 A | * | 12/1980 | Takeuchi ............ | B60R 13/0884 181/204 |
| 6,491,133 B2 | * | 12/2002 | Yamada .................. | F02B 77/13 181/204 |
| 8,919,469 B2 | * | 12/2014 | Shatters ................ | B60K 11/00 180/68.1 |
| 10,214,159 B1 | * | 2/2019 | An ...................... | B60R 13/0838 |
| 2019/0048779 A1 | * | 2/2019 | Hoshino .................. | F01P 11/10 |

FOREIGN PATENT DOCUMENTS

JP 2019039303 A 3/2019

* cited by examiner

*Primary Examiner* — Pinel E Romain
(74) *Attorney, Agent, or Firm* — Alleman Hall Creasman & Tuttle LLP

(57) ABSTRACT

An engine bay structure of a vehicle is provided, which includes a capsule cover surrounding an engine. The capsule cover includes a lid part configured to cover the engine from above and a side wall part configured to cover the engine from outside in a vehicle width direction. The side wall part is divided in a vehicle front-and-rear direction into a plurality of vertical walls extending in an up-and-down direction, and one of the plurality of vertical walls is a specific vertical wall to which an electric component is attached at a side surface part thereof opposite from the engine.

11 Claims, 9 Drawing Sheets

ENGINE BAY STRUCTURE OF VEHICLE AND METHOD OF ASSEMBLING CAPSULE COVER

TECHNICAL FIELD

The technology disclosed herein belongs to a technical field related to a structure of an engine bay of a vehicle and a method of assembling a capsule cover which constitutes the engine bay.

BACKGROUND OF THE DISCLOSURE

Conventionally, in order to improve the heat retaining property of engines, providing a capsule cover which surrounds the engine to an engine bay has been considered.

For example, JP2019-039303A discloses an engine bay structure provided with a heat-insulation member (capsule cover) comprised of an upper lid part which covers an upper part of the engine, and a side wall part which covers the sides of the engine. In this engine bay structure, a part of the side wall part is comprised of intake component(s) of the engine.

Meanwhile, recently, devices which constitute the vehicle engine is based on an electronic control, and electric components including an ECU (Electrical Control Unit) for controlling each device is provided near the engine. The ECU is designed based on semiconductor devices in many cases, and therefore, tends to be influenced by heat from the engine. Therefore, when those electric components are disposed inside the capsule cover, the performance of the electric components may be degraded.

For this reason, the electric components are attached to the exterior of the capsule cover. However, due to recent demands for downsizing the vehicle, the capsule cover tends to be located considerably close to the vehicle-body constituting member(s). Therefore, by only disposing the electric component(s) on the exterior of the capsule cover, the freedom in arranging electric component(s) around the capsule cover is lowered.

SUMMARY OF THE DISCLOSURE

Therefore, the technology disclosed herein is made in view of the above situations, and one purpose thereof is to improve the ability to assemble an electric component as much as possible while cooling the electric component appropriately, in an engine bay having a capsule cover surrounding the engine.

According to one aspect of the present disclosure, an engine bay structure of a vehicle is provided, which includes a capsule cover surrounding an engine. The capsule cover includes a lid part configured to cover the engine from above and a side wall part configured to cover the engine from outside in a vehicle width direction. The side wall part is divided in a vehicle front-and-rear direction into a plurality of vertical walls extending in an up-and-down direction, and one of the plurality of vertical walls is a specific vertical wall to which an electric component is attached at a side surface part thereof opposite from the engine.

According to this structure, since the side wall part is comprised of the plurality of vertical walls including the specific vertical wall, the specific vertical wall can be disposed at the side of the engine after the electric component is attached to the specific vertical wall. Therefore, the electric component can easily be disposed in the engine bay in the state where the electric component is attached outside the capsule cover. Therefore, the ability to assemble the electric component can be improved as much as possible.

Moreover, by disposing the electric component outside the capsule cover, the electric component can also be cooled appropriately.

The specific vertical wall may be disposed at a position separated from a suspension tower with a gap therebetween in the vehicle width direction. The electric component may be attached to the specific vertical wall so that the electric component is located between the specific vertical wall and the suspension tower.

That is, through an area in the engine bay between the engine and the suspension tower, the traveling wind easily passes. Thus, by disposing the electric component between the specific vertical wall and the suspension tower, cooling efficiency of the electric component can be improved.

The electric component may be also attached to and supported by the suspension tower, in addition to the specific vertical wall.

According to this structure, the support rigidity of the electric component can be increased. Thus, the electric component can be maintained at the posture in which the traveling wind easily flows, and as a result, the cooling efficiency of the electric component can be improved.

Additional vertical walls of the plurality of vertical walls may be disposed each of forward and rearward of the specific vertical wall. The specific vertical wall may be attached to the additional vertical walls, without being attached to a vehicle-body constituting member. A fitting part of the specific vertical wall to each of the additional vertical walls may be located in an upper end part of the specific vertical wall.

According to this structure, removal of the specific vertical wall becomes easier. Therefore, removal of the electric component also becomes easier. As a result, the ability to maintain the electric component can also be improved.

According to one aspect of the present disclosure, a method of disposing a capsule cover in an engine bay of a vehicle is provided. The capsule cover has a side wall part configured to surround an engine disposed in the engine bay and cover side parts of the engine in a vehicle width direction. The side wall part is comprised of a plurality of vertical walls extending in an up-and-down direction. The method includes preparing a subassembly by attaching an electric component to a specific vertical wall that is one of the plurality of vertical walls, disposing the subassembly, after the subassembly is prepared, so that the electric component is located on the opposite side in the vehicle width direction from the engine with respect to the specific vertical wall, and attaching the electric component to a vehicle-body constituting member, after the subassembly is disposed.

According to this structure, after the electric component is attached to the specific vertical wall in advance, the electric component can be attached to and supported by the vehicle-body constituting member together with the specific vertical wall. Therefore, the ability to assemble the electric component can be improved.

Moreover, by disposing the electric component outside the capsule cover, the electric component can also be cooled appropriately.

The disposing the subassembly may include disposing the specific vertical wall so that the electric component is located between the specific vertical wall and a suspension tower in the vehicle width direction. The attaching the electric component may include attaching the electric component to an upper surface part of the suspension tower.

According to this structure, since the electric component is attached to the upper surface part of the suspension tower, the attaching to the vehicle is easy. Therefore, the ability to assemble the electric component can be improved.

Moreover, since the electric component is located in the area between the specific vertical wall and the suspension tower, through which the traveling wind easily passes, the cooling efficiency of the electric component can be improved.

The engine bay structure may further include a rear wall part configured to cover the engine from behind. The side wall part may include a first vertical wall extending from a front end part of the side wall part to near a suspension tower disposed on the left side of the vehicle, a second vertical wall disposed so as to oppose to the left suspension tower with a gap therebetween, and a third vertical wall extending rearward from a rear end part of the second vertical wall and integrated with the rear wall part. The specific vertical wall may be the second vertical wall.

The electric component may be a powertrain control module, and the powertrain control module may have a plurality of fins extending to the left and the right. The specific vertical wall may be provided, at a tip end part of a protrusion thereof, with an engagement part configured to engage with an engagement hole formed in a bracket. The powertrain control module may be attached to the specific vertical wall by the engagement part engaging with the engagement hole of the bracket.

DETAILED DESCRIPTION OF THE DISCLOSURE

Hereinafter, one embodiment of the present disclosure is described in detail with reference to the accompanying drawings. Note that, in the following description, "front," "rear," "left," "right," "up," and "down" of a vehicle 1 are simply referred to as "front," "rear," "left," "right," "up," and "down," respectively. Note that the term "outward(ly)" or "outer" or "outside" as used herein refers to outward(ly) in the vehicle width direction with respect to the center line extending in the longitudinal direction of the vehicle, and the term "inward(ly)" or "inner" or "inside" as used herein refers to inward(ly) in the vehicle width direction with respect to the center line.

Figure 1:
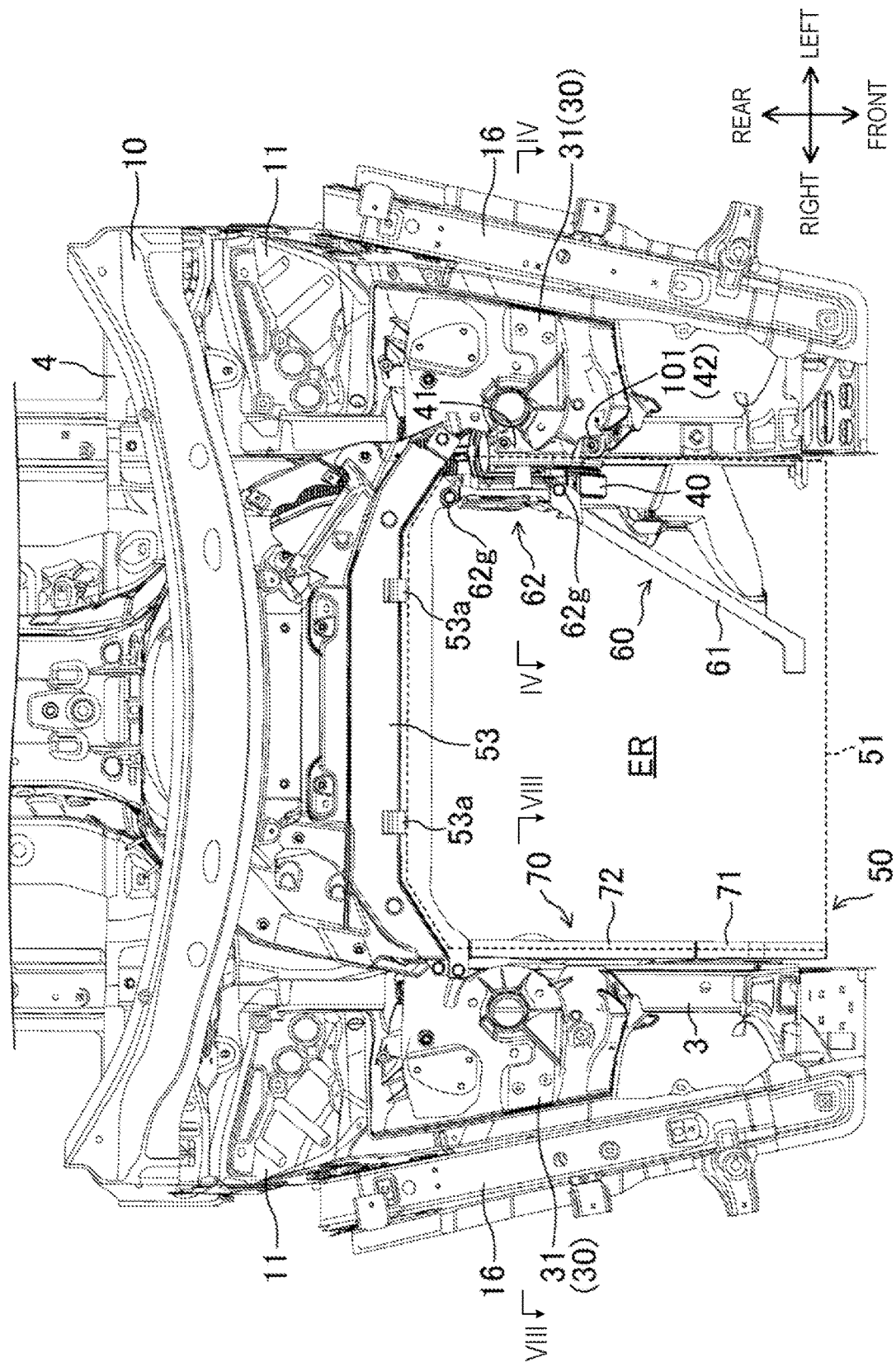
FIG. 1 is a plan view illustrating a front part of a vehicle to which an engine bay structure according to one embodiment is applied, seen from above.

FIG. 1 schematically illustrates a front part of the vehicle 1 where an engine bay ER is provided. In the front part of the vehicle 1, a pair of left-and-right front side frames 3 extending in the front-and-rear direction are disposed forward of a dash panel, and between the left and right front side frames 3, the engine bay ER where an engine (not illustrated) which drives front wheels (not illustrated) of the vehicle 1 and a transmission (not illustrated) are disposed is formed. The engine is, for example, longitudinally oriented inside the engine bay ER, and the transmission is disposed rearward of the engine.

Figure 9:
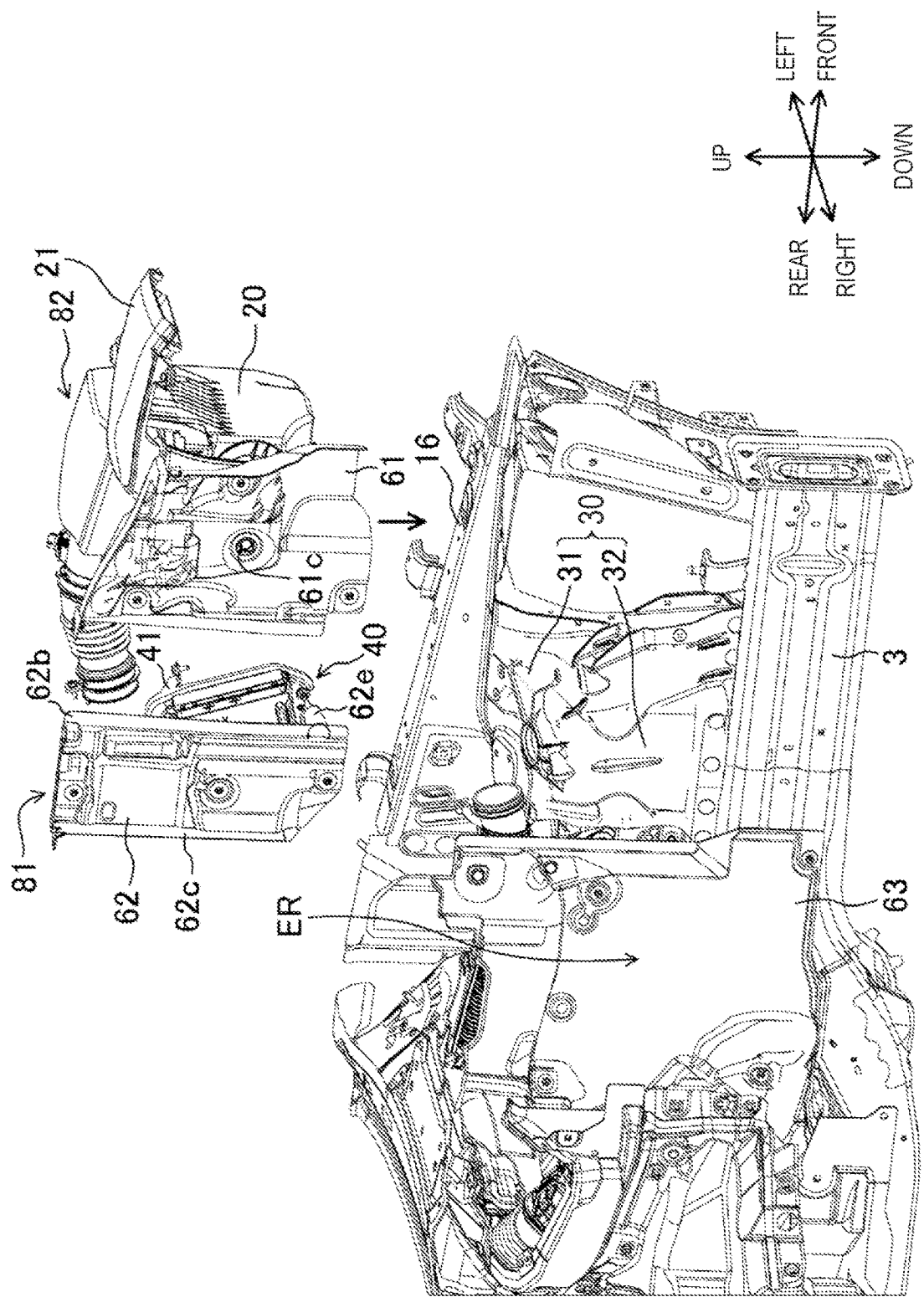
FIG. 9 is a schematic view illustrating an assembling procedure of the capsule cover.

Each of the pair of left-and-right front side frames 3 has a substantially rectangular closed cross-section. As illustrated in FIG. 9, a rear part of each front side frame 3 is a kick part in which the height becomes lower gradually toward the rear. In the front-and-rear direction, a dash panel 4 (see FIG. 2) which divides the engine bay ER from a cabin is provided at the same position as the kick part.

A pair of left-and-right apron reinforcements 16 extending in the front-and-rear direction are disposed above the front side frames 3. Each apron reinforcement 16 is located outside the corresponding front side frame 3 in the vehicle width direction. A front end part of each front side frame 3 and a front end part of the corresponding apron reinforcement 16 are coupled to each other by a front frame coupling part (not illustrated) extending in the up-and-down direction.

Figure 4:
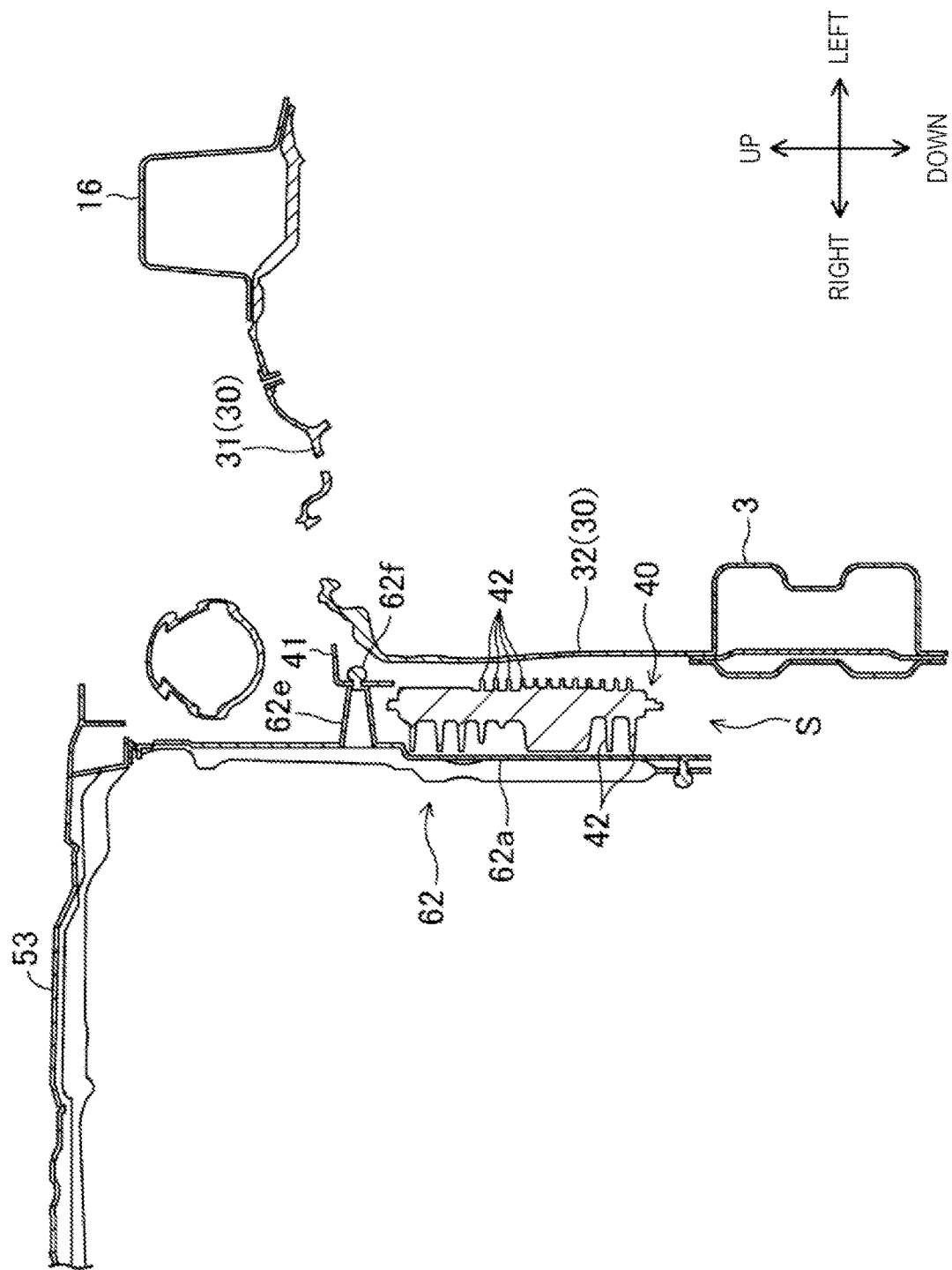
FIG. 4 is a cross-sectional view taken along a line IV-IV in FIG. 1.

An outer side wall part of each front side frame 3 and an inner side wall part of the corresponding apron reinforcement 16 are coupled by a suspension tower 30. Each suspension tower 30 bulges inwardly in the vehicle width direction of the corresponding apron reinforcement 16 (i.e., on the engine bay ER side). As illustrated in FIGS. 4 and 9, each suspension tower 30 has an annular top part 31 to which an upper end of a front damper is attached, and a partially cylindrical circumferential wall 32 extending downwardly from the circumferential edge of the top part 31, particularly on the engine bay ER side (i.e., inside in the vehicle width direction). A bottom end part of the top part 31 and a top end part of the circumferential wall 32 are welded together. The outside part of the top part 31 is welded to the corresponding apron reinforcement 16. A bottom end part of the circumferential wall 32 is welded to the corresponding front side frame 3.

A cowl member 10 extending in the vehicle width direction is provided above the dash panel 4. At a position corresponding to each of left-and-right end parts of the cowl member 10, a front hinge pillar 11 for rotatably supporting a front door (not illustrated) of the vehicle 1 is provided.

Figure 2:
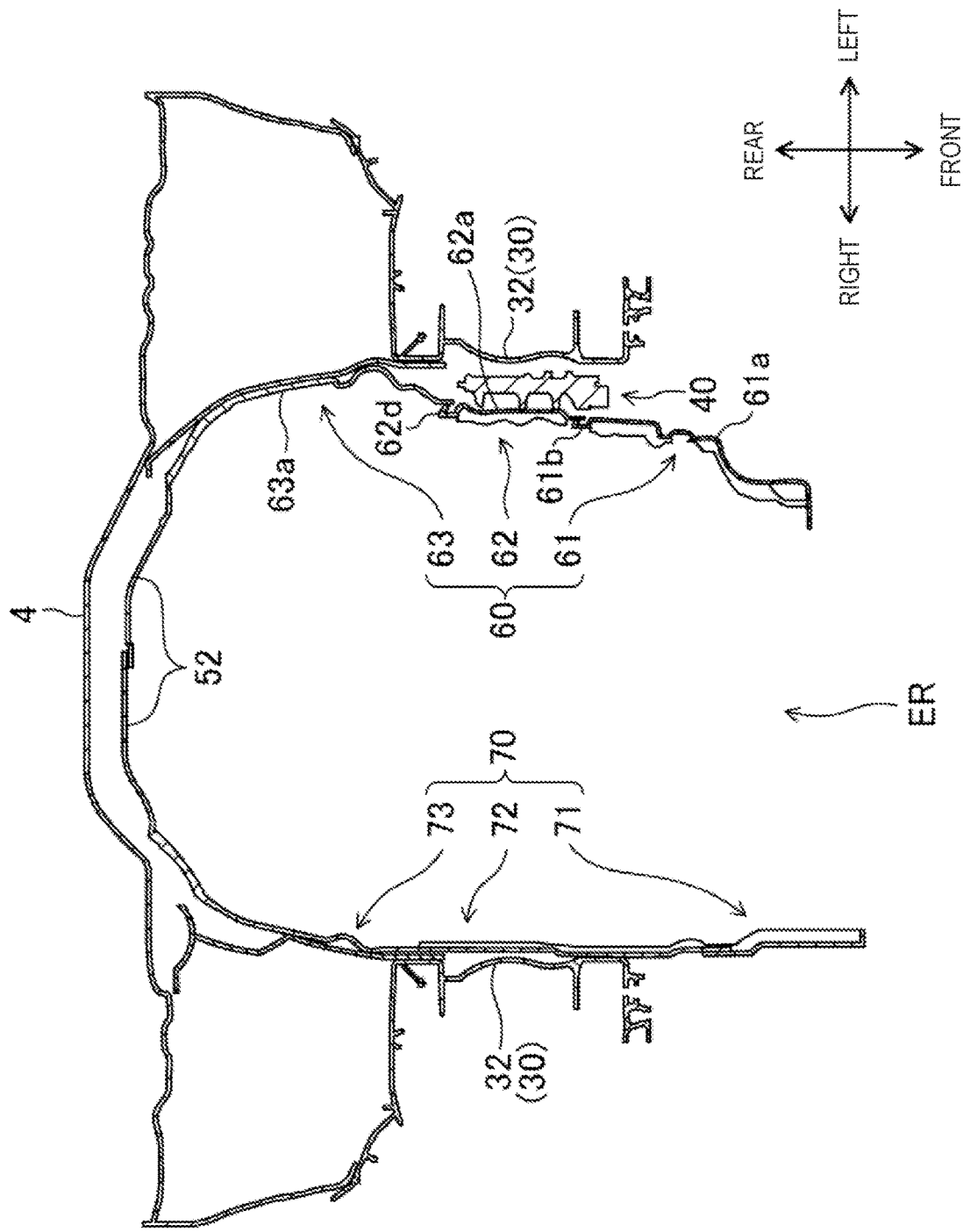
FIG. 2 is a cross-sectional view of an engine bay taken along a plane which passes through an electric component and spreads horizontally.

A capsule cover 50 which surrounds the periphery of the engine disposed inside the engine bay ER is provided to the engine bay ER. As illustrated in FIGS. 1 and 2, the capsule cover 50 includes a lid part 51 (the broken line in FIG. 1) which covers the engine from above, a support wall part 53 which covers the engine from above and supports a rear part of the lid part 51, a left-side side wall part 60 which covers the left side of the engine from outside in the vehicle width direction, a right-side side wall part 70 which covers the right side of the engine from outside in the vehicle width direction, and a rear wall part 52 (see FIG. 2, etc.) which covers the rear side of the engine. As described later in detail, the left-side and right-side side wall parts 60 and 70 are each divided into a plurality of vertical walls, and the rearmost vertical walls (a third vertical wall 63 and a sixth vertical wall 73 which will be described later) are formed integrally with the rear wall part 52. Each of the wall parts 51, 52, 53, 60, and 70 is comprised of a panel member made of resin as an outer skin, and a heat-insulation member made of glass wool or urethane, and disposed integrally with the panel member.

As illustrated in FIG. 1, the support wall part 53 is provided with a pair of support parts 53a which are separated to the left and the right. The pair of support parts 53a pivotably support a rear end part of the lid part 51. Thus, the lid part 51 is pivotable using the support parts 53a as fulcrums. As a result, when the lid part 51 is opened, the engine can be visually examined, and therefore, the ability to maintain the engine improves.

As illustrated in FIGS. 1 and 2, the capsule cover 50 according to this embodiment is not symmetrical in the vehicle width direction, and the left-side side wall part 60 and the right-side side wall part 70 have different structures. Below, each structure is described in detail.

Figure 3:
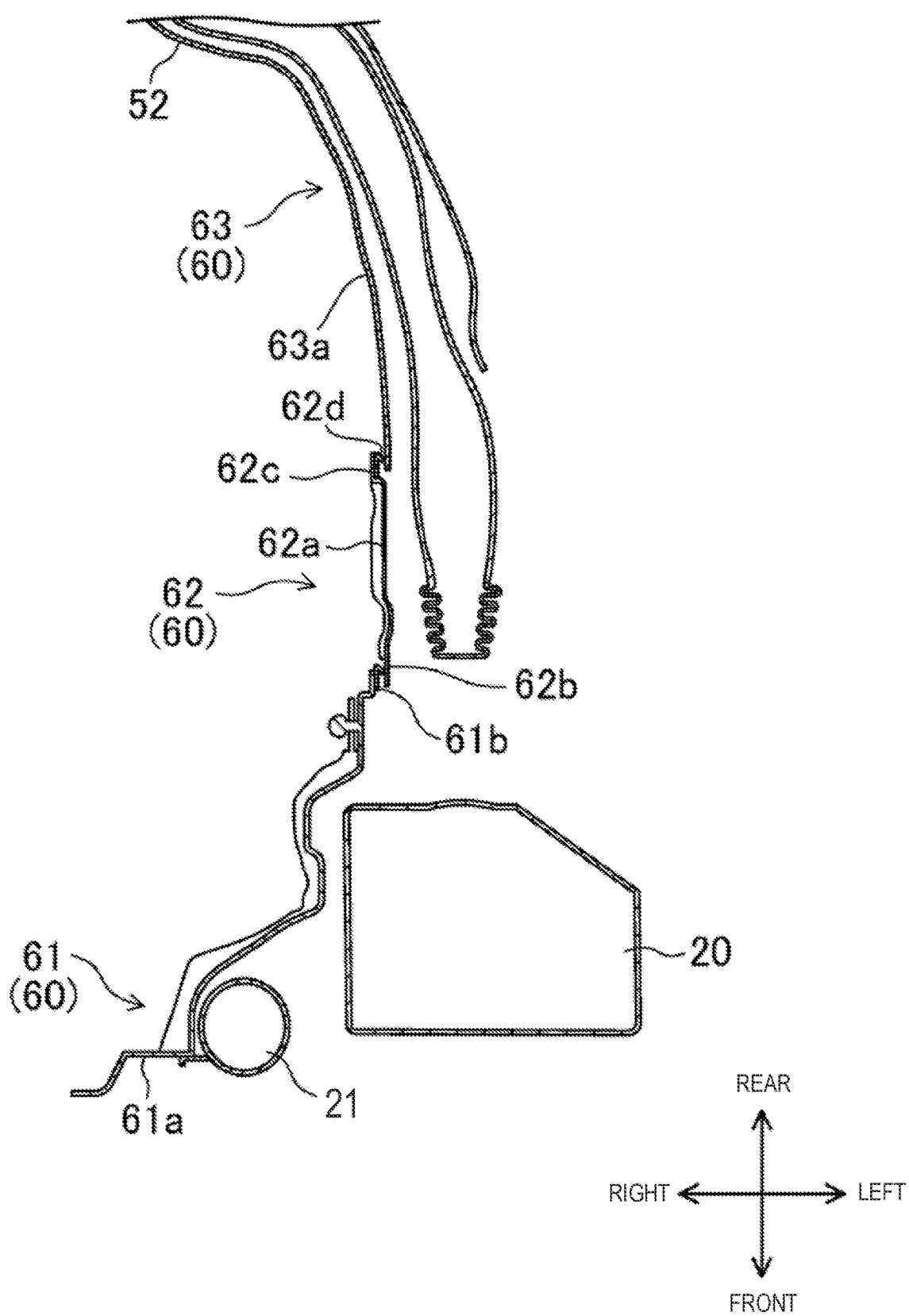
FIG. 3 is a cross-sectional view of the engine bay taken along a plane which passes through an intake pipe and spreads horizontally.

As illustrated in FIGS. 2 and 3, the left-side side wall part 60 is divided into three vertical walls extending in the up-and-down direction. In detail, it has a first vertical wall 61 extending from a front end part of the left-side side wall part 60 to near the left suspension tower 30, a second vertical wall 62 disposed so as to oppose to the left suspension tower 30 with a gap S therebetween, and the third vertical wall 63 which extends rearwardly from a rear end part of the second vertical wall 62 and is integrated with the rear wall part 52.

As illustrated in FIGS. 1 to 3, the first vertical wall 61 extends from the front to the rear so that it is inclined to the left. In the first vertical wall 61, a heat-insulation member is attached to a right surface of a first panel member 61a made of resin. A rear end part of the first panel member 61a has a first sealant 61b for filling a gap with the second vertical wall 62. As illustrated in FIG. 3, the first sealant 61b extends leftward and inclines forward. Although illustration is omitted, the first vertical wall 61 is fixed at a lower end part to the left front side frame 3 with bolts.

Between the left apron reinforcement 16 and the first vertical wall 61, a comparatively large gap is formed when seen from above. An air cleaner 20 is disposed in this gap. As illustrated in FIG. 9, the air cleaner 20 is attached to the first vertical wall 61 through a fitting part 61c. An air duct 21 for introducing outside air is fixed to the air cleaner 20. Although illustration is omitted, the air duct 21 is attached to the front frame coupling part through bolts.

As illustrated in FIGS. 1 to 3, the second vertical wall 62 is disposed so as to overlap with the left suspension tower 30 in the vehicle width direction. In the second vertical wall 62, a heat-insulation member is attached to the right surface of a second panel member 62a made of resin.

As illustrated in FIGS. 2 and 3, while a front end part 62b of the second panel member 62a is located in the left side of the rear end part of the first vertical wall 61, a rear end part 62c of the second panel member 62a is located in the right side of the rear end part of the third vertical wall 63. The rear end part 62c of the second vertical wall 62 has a second sealant 62d for filling a gap with the third vertical wall 63. As illustrated in FIG. 3, the second sealant 62d inclines forward and leftward.

As illustrated in FIG. 4, the second vertical wall 62 is not connected to a vehicle-body constituting member, such as the front side frame 3. The second vertical wall 62 is indirectly supported by the vehicle-body constituting member by being attached to the first vertical wall 61 and the third vertical wall 63. As illustrated in FIG. 1, fitting parts 62g of the second vertical wall 62 to the first vertical wall 61 and the third vertical wall 63 are located at an upper end part of the second vertical wall 62.

As illustrated in FIG. 4, a PCM (Powertrain Control Module) 40 as the electric component is attached to a left surface part of the second panel member 62a of the second vertical wall 62. A bracket 41 is attached to the PCM 40 with bolts 101, and the PCM 40 is attached to the second vertical wall 62 through the bracket 41. The PCM 40 has a plurality of fins 42 extending to the left and the right. The fins 42 are for expanding the exposed area of the PCM 40 to improve a cooling efficiency of the PCM 40.

Figure 5:
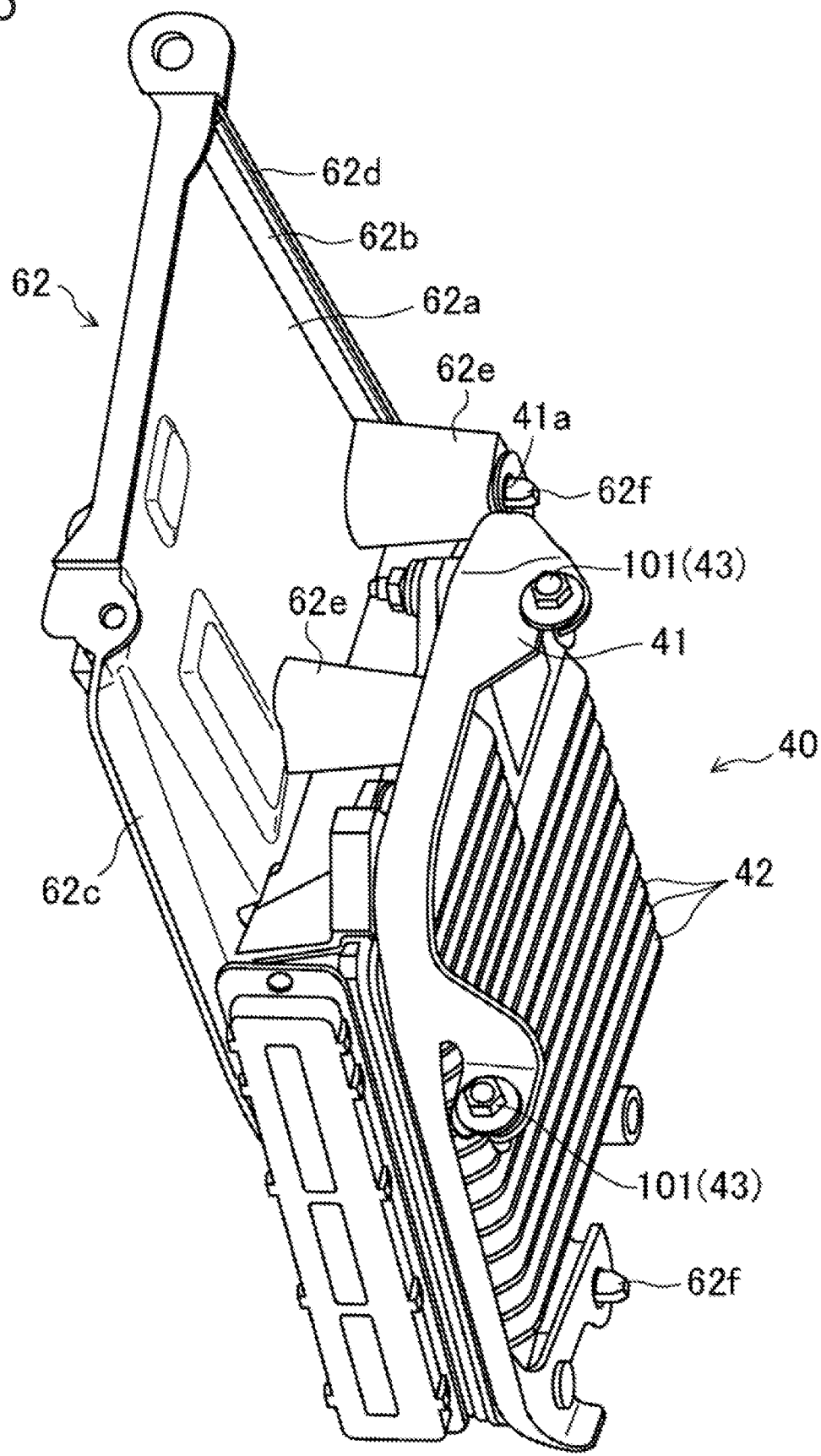
FIG. 5 is a perspective view of a first vertical wall to which a powertrain control module (PCM) is attached, seen from obliquely upward.

In detail, as illustrated in FIG. 5, a plurality of (three in FIG. 5) protrusions 62e project to the left from the second panel member 62a. An engagement part 62f for engaging with an engagement hole 41a (see FIG. 7) formed in the bracket 41 is provided to a tip end part of each protrusion 62e. By these engagement parts 62f engaging with the respective engagement holes 41a of the bracket 41, the PCM 40 is attached to the second vertical wall 62. Therefore, the second vertical wall 62 is an example of a specific vertical wall to which an electric component is attached to a side surface part (here, a left surface part) opposite from the engine.

By providing the protrusions 62e to the second panel member 62a, the right fins 42 can be increased in the size as much as possible, as illustrated in FIG. 4. In addition, a traveling wind, which is wind caused by the vehicle traveling, can be easier to get through gaps between the right fins 42. Therefore, the cooling efficiency of the PCM 40 can be improved.

As illustrated in FIGS. 2 and 4, the PCM 40 is attached to the second vertical wall 62 so that it is located between the second vertical wall 62 and the circumferential wall 32 of the left suspension tower 30. In a state where the PCM 40 is disposed in the engine bay ER, the PCM 40 is separated from the circumferential wall 32 of the left suspension tower 30. Therefore, the traveling wind can pass through between the PCM 40 and the suspension tower 30 to cool the PCM 40 efficiently.

Figure 6:
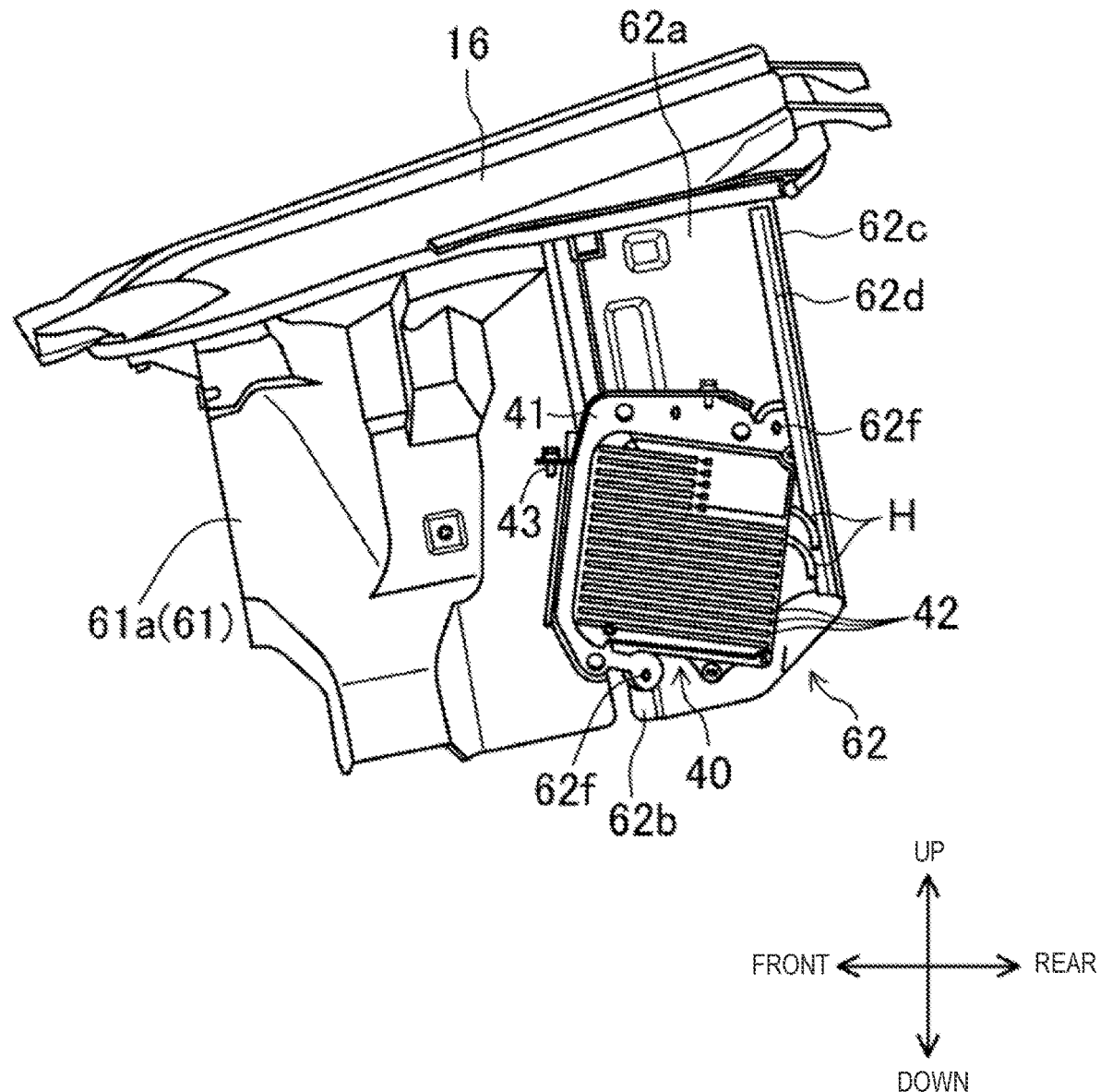
FIG. 6 is a side view of a part of a side wall part to which the PCM is attached, seen from the left side of the vehicle.
Figure 7:
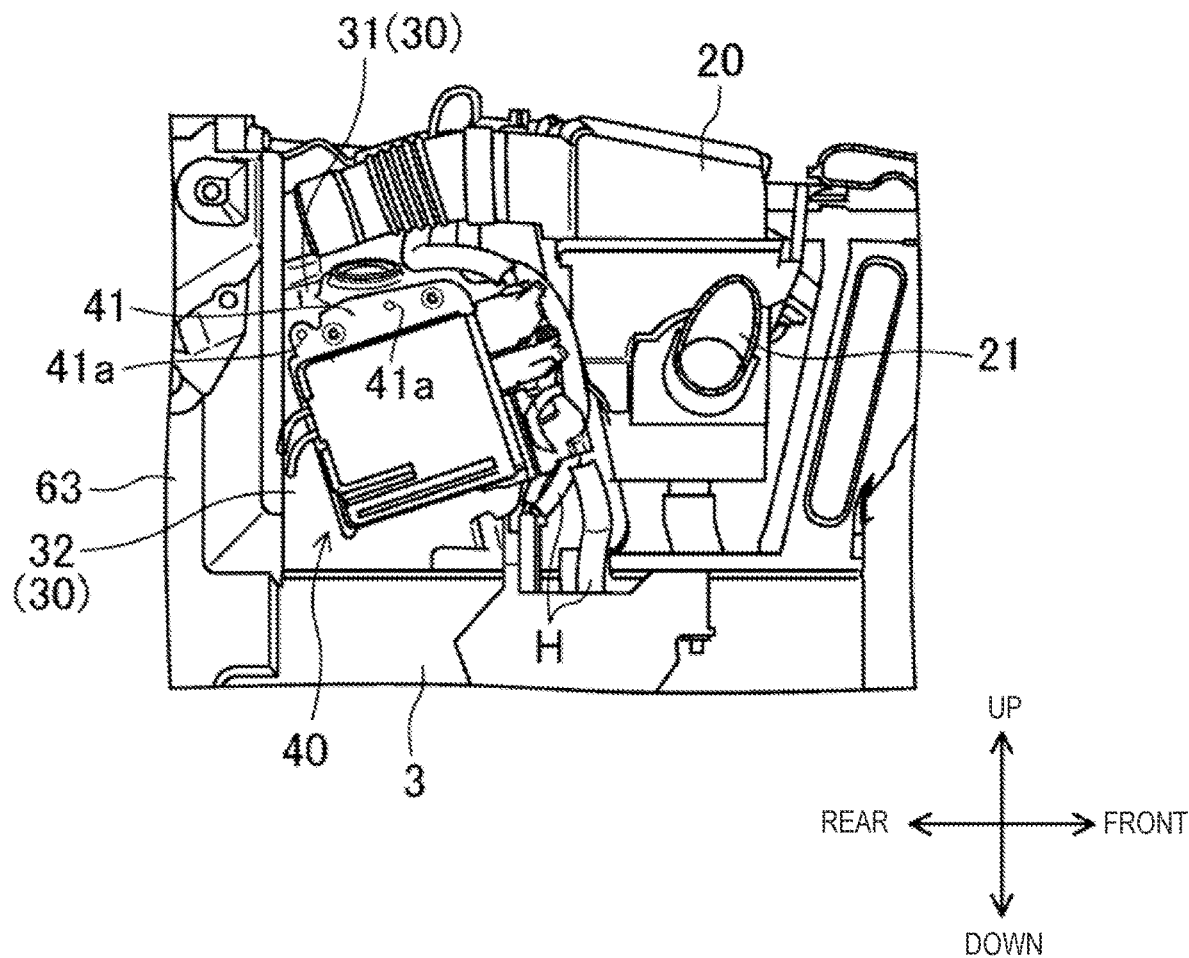
FIG. 7 is a side view of a left-side part of the inside of a capsule cover, seen from the right side of the vehicle, from which the first vertical wall and a second vertical wall are removed.

The PCM 40 has a connection opening to be connected to a harness H at a front side. As illustrated in FIG. 6, the PCM 40 is inclined rearward and upward while being attached to the second vertical wall 62. Therefore, the connection opening of the PCM 40 faces upward. Therefore, as illustrated in FIG. 7, the harness H can be connected from above, and the workability improves.

As illustrated in FIG. 5, a front hole part and a rear hole part into which bolts 101 are inserted are formed in an upper part of the bracket 41. As illustrated in FIG. 1, the bolt 101 is fastened to the top part 31 of the left suspension tower 30 to be a coupling part 43 which couples the bracket 41 to the suspension tower 30. When seen from the left side, while the front coupling part 43 is located forward of the second vertical wall 62, the rear coupling part 43 is located rearward of the center of the second vertical wall 62 in the front-and-rear direction. That is, the PCM 40 is also attached to and supported by the left suspension tower 30 through the bracket 41, in addition to the second vertical wall 62.

By the PCM 40 being attached to and supported by the suspension tower 30 through the bracket 41, the second vertical wall 62 is indirectly supported by the suspension tower 30 which is the vehicle-body constituting member, through the bracket 41. Moreover, since the coupling part 43 of the PCM 40 and the suspension tower 30 is also provided to the rear, the rear end part 62c of the second vertical wall 62 is pulled to the left. Therefore, the second sealant 62d is pressed against the third vertical wall 63. As a result, the sealability of the second sealant 62d improves.

In the third vertical wall 63, a heat-insulation member is attached to the right surface of a third panel member 63a made of resin. The third panel member 63a continues from the panel member which constitutes the rear wall part 52, and this heat-insulation member is also the same as the heat-insulation member of the rear wall part 52. Although illustration is omitted, the third vertical wall 63 is fixed at a lower end part to the left front side frame 3 with bolts.

The right-side side wall part 70 is divided into three vertical walls extending in the up-and-down direction, similar to the left-side side wall part 60. In detail, the right-side side wall part 70 has a fourth vertical wall 71 located relatively at the foremost, a fifth vertical wall 72 disposed so as to oppose to the right suspension tower 30, and the sixth vertical wall 73 which extends rearward from a rear end part of the fifth vertical wall 72 and is integrated with the rear wall part 52.

In each of the fourth to sixth vertical walls 71-73, a heat-insulation member is attached to the left surface of the panel member made of resin. Although illustration is omitted, the fourth to sixth vertical walls 71-73 are fixed to the right front side frame 3 with bolts.

Figure 8:
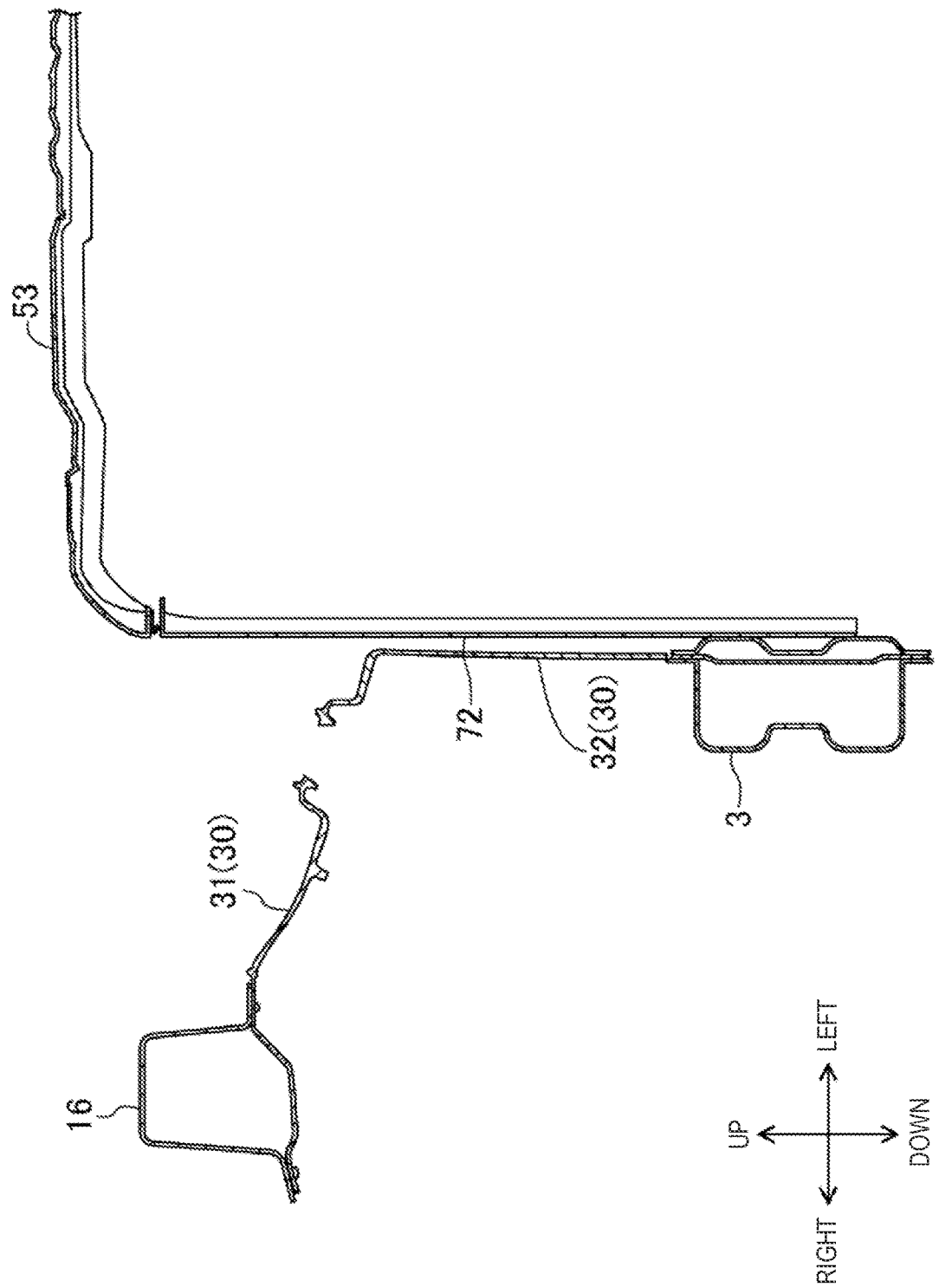
FIG. 8 is a cross-sectional view taken along a line VIII-VIII in FIG. 1.

As illustrated in FIG. 8, a gap between the fifth vertical wall 72 and the right suspension tower 30 is narrower than the gap between the second vertical wall 62 and the left suspension tower 30. Therefore, the vehicle width can be reduced as much as possible.

Next, a method of assembling the left-side side wall part 60 is described. As illustrated in FIG. 9, when assembling the left-side side wall part 60, the third vertical wall 63 is first assembled to the vehicle-body constituting member (e.g., the front side frame 3) together with the rear wall part 52.

Next, the PCM 40 is attached to the second vertical wall 62 to prepare a first subassembly 81 (a first process).

Then, the air cleaner 20 is attached to the first vertical wall 61 to prepare a second subassembly 82.

Next, the first subassembly 81 is disposed so that the PCM 40 is located on the opposite side of the engine in the vehicle width direction with respect to the second vertical wall 62, in detail, so that the PCM 40 is located between the second vertical wall 62 and the left suspension tower 30 in the vehicle width direction (a second process). At this time, the second vertical wall 62 is attached to the third vertical wall 63 through the fitting part 62g.

Next, the bracket 41 of the PCM 40 is attached to the top part 31 of the left suspension tower 30 so that the PCM 40 is attached to and supported by the suspension tower 30.

Then, the second subassembly 82 is disposed in the engine bay ER, and the first vertical wall 61 is attached to the vehicle-body constituting member (e.g., the front side frame 3). At this time, the air duct 21 is also attached to the vehicle-body constituting member.

Then, the first vertical wall 61 is attached to the second vertical wall 62 through the fitting part 62g.

As described above, the left-side side wall part 60 of the capsule cover 50 is attached to the vehicle 1. Thus, by attaching the PCM 40 to, and supporting the PCM 40 by, the vehicle-body constituting member together with the second vertical wall 62 after the PCM 40 is attached to the second vertical wall 62 in advance, the ability to assemble the PCM 40 can be improved.

Here, although the capsule cover 50 is provided for the purpose of the heat insulation of the engine, the performance of the PCM 40 may be degraded by heat if the PCM 40 which carries out an electronic control of the engine is also disposed inside the capsule cover 50.

On the other hand, like this embodiment, the PCM 40 may be disposed outside the capsule cover 50. According to this structure, an excessive increase in the temperature of the PCM 40 can be suppressed. Moreover, by disposing the PCM 40 outside the capsule cover 50, the PCM 40 can also be cooled appropriately.

On the other hand, because of the current demands of downsizing the vehicle 1, the capsule cover 50 and the vehicle-body constituting member (the suspension tower 30, etc.) tend to be located considerably close to each other. Therefore, the ability to assemble the PCM 40 is lowered by only disposing the PCM 40 outside the capsule cover 50.

On the other hand, according to this embodiment, since the left-side side wall part 60 where the PCM 40 is disposed is comprised of the plurality of vertical walls including the second vertical wall 62, the second vertical wall 62 can be disposed at the side of the engine after the PCM 40 is attached to the second vertical wall 62. Therefore, the PCM 40 can easily be disposed in the engine bay ER in the state where the PCM 40 is attached outside the capsule cover 50. Therefore, the ability to assemble the PCM 40 can be improved as much as possible.

Moreover, in this embodiment, the second vertical wall 62 is disposed at the position which opposes in the vehicle width direction to the left suspension tower 30 with the gap S therebetween. The PCM 40 is attached to the second vertical wall 62 so that it is located between the second vertical wall 62 and the left suspension tower 30. Thus, because the PCM 40 is disposed so as to be located between the second vertical wall 62 and the suspension tower 30, more traveling wind hits the PCM 40. As a result, the cooling efficiency of the PCM 40 can be improved.

Moreover, in this embodiment, the electric component, such as the PCM 40, is not disposed between the fifth vertical wall 72 of the right-side side wall part 70 and the right suspension tower 30. Therefore, the vehicle width can be reduced as much as possible.

Moreover, in this embodiment, the first vertical wall 61 is disposed forward of the second vertical wall 62, the third vertical wall 63 is disposed rearward of the second vertical wall 62, and the second vertical wall 62 is attached to the first and third vertical walls 61 and 63 without being attached to the vehicle-body constituting member. The fitting parts 62g for the second vertical wall 62 to the first and third vertical walls 61 and 63 are located in the upper end part of the second vertical wall. Therefore, removal of the second vertical wall 62 becomes easier. Therefore, removal of the PCM 40 also becomes easier. As a result, the ability to maintain the PCM 40 can also be improved.

Moreover, in this embodiment, the PCM 40 is also attached to and supported by the left suspension tower 30, in addition to the second vertical wall 62. Therefore, the support rigidity of the PCM 40 can be increased. As a result, the PCM 40 can be maintained at the posture in which the traveling wind easily flows, and the cooling efficiency of the PCM 40 can be improved.

Particularly, in this embodiment, one of the coupling parts 43 of the PCM 40 and the suspension tower 30 is located rearward of the center of the second vertical wall 62 in the front-and-rear direction. Therefore, the rear end part 62c of the second vertical wall 62 is pulled to the left. Therefore, the second sealant 62d is pressed against the third vertical wall 63. As a result, the sealability of the second sealant 62d can be improved.

OTHER EMBODIMENTS

The technology disclosed herein is not limited to the above embodiment, and can be substituted without departing from the spirit of the appended claims.

For example, although in the above embodiment the PCM 40 is also attached and fixed to the suspension tower 30 in addition to the second vertical wall 62, it does not need to be attached to the suspension tower 30.

Moreover, although in the above embodiment the PCM 40 for controlling the operation of the engine is illustrated as the electric component, it is not limited to the PCM 40 and as long as it is an electric component which tends to receive the effect by the heat, such as a semiconductor device, it may be the electric component in the technology of the present disclosure.

The above embodiment is merely illustration and should not be interpreted as limiting the scope of the present disclosure. The scope of the present disclosure is defined by the appended claims, and all of changes and modifications which belong to the equivalent of the appended claims fall within the scope of the present disclosure.

The technology disclosed herein is useful for the engine bay structure of the vehicle in which the electric component is disposed in the engine bay.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
30 Suspension Tower (Vehicle-Body Constituting Member)
40 PCM (Electric Component)
50 Capsule Cover
51 Lid Part
60 Left-Side Side Wall Part
61 First Vertical Wall (Additional Vertical Wall)
62 Second Vertical Wall (Specific Vertical Wall)
63 Third Vertical Wall (Additional Vertical Wall)
81 First Subassembly
ER Engine Bay

What is claimed is:

1. An engine bay structure of a vehicle, comprising:
a capsule cover surrounding an engine, the capsule cover including:
   a lid part configured to cover the engine from above; and
   a side wall part configured to cover the engine from outside in a vehicle width direction,
wherein the side wall part is divided in a vehicle front-and-rear direction into a plurality of vertical walls extending in an up-and-down direction, and
wherein one of the plurality of vertical walls is a specific vertical wall to which an electric component is attached at a side surface part thereof opposite from the engine.

2. The engine bay structure of claim 1,
wherein the specific vertical wall is disposed at a position separated from a suspension tower with a gap therebetween in the vehicle width direction, and
wherein the electric component is attached to the specific vertical wall so that the electric component is located between the specific vertical wall and the suspension tower.

3. The engine bay structure of claim 2, wherein the electric component is also attached to and supported by the suspension tower, in addition to the specific vertical wall.

4. The engine bay structure of claim 3,
wherein additional vertical walls of the plurality of vertical walls are disposed each of forward and rearward of the specific vertical wall,
wherein the specific vertical wall is attached to the additional vertical walls, without being attached to a vehicle-body constituting member, and
wherein a fitting part of the specific vertical wall to each of the additional vertical walls is located in an upper end part of the specific vertical wall.

5. A method of disposing a capsule cover in an engine bay of a vehicle, the capsule cover having a side wall part configured to surround an engine disposed in the engine bay and cover side parts of the engine in a vehicle width direction, the side wall part being comprised of a plurality of vertical walls extending in an up-and-down direction, the method comprising:
preparing a subassembly by attaching an electric component to a specific vertical wall that is one of the plurality of vertical walls;
disposing the subassembly, after the subassembly is prepared, so that the electric component is located on the opposite side in the vehicle width direction from the engine with respect to the specific vertical wall; and
attaching the electric component to a vehicle-body constituting member, after the subassembly is disposed.

6. The method of claim 5,
wherein the disposing the subassembly includes disposing the specific vertical wall so that the electric component is located between the specific vertical wall and a suspension tower in the vehicle width direction, and
wherein the attaching the electric component includes attaching the electric component to an upper surface part of the suspension tower.

7. The engine bay structure of claim 1,
wherein additional vertical walls of the plurality of vertical walls are disposed each of forward and rearward of the specific vertical wall,
wherein the specific vertical wall is attached to the additional vertical walls, without being attached to a vehicle-body constituting member, and
wherein a fitting part of the specific vertical wall to each of the additional vertical walls is located in an upper end part of the specific vertical wall.

8. The engine bay structure of claim 2,
wherein additional vertical walls of the plurality of vertical walls are disposed each of forward and rearward of the specific vertical wall,
wherein the specific vertical wall is attached to the additional vertical walls, without being attached to a vehicle-body constituting member, and
wherein a fitting part of the specific vertical wall to each of the additional vertical walls is located in an upper end part of the specific vertical wall.

9. The engine bay structure of claim 1, further comprising a rear wall part configured to cover the engine from behind,
wherein the side wall part includes:
   a first vertical wall extending from a front end part of the side wall part to near a suspension tower disposed on the left side of the vehicle;

a second vertical wall disposed so as to oppose to the left suspension tower with a gap therebetween; and a third vertical wall extending rearward from a rear end part of the second vertical wall and integrated with the rear wall part, and wherein the specific vertical wall is the second vertical wall.

10. The engine bay structure of claim 1, wherein the electric component is a Powertrain Control Module (PCM), the PCM having a plurality of fins extending to the left and the right, wherein the specific vertical wall is provided, at a tip end part of a protrusion thereof, with an engagement part configured to engage with an engagement hole formed in a bracket, and wherein the PCM is attached to the specific vertical wall by the engagement part engaging with the engagement hole of the bracket.

11. The engine bay structure of claim 9, wherein the electric component is a Powertrain Control Module (PCM), the PCM having a plurality of fins extending to the left and the right, wherein the specific vertical wall is provided, at a tip end part of a protrusion thereof, with an engagement part configured to engage with an engagement hole formed in a bracket, and wherein the PCM is attached to the specific vertical wall by the engagement part engaging with the engagement hole of the bracket.

\* \* \* \* \*